United States Patent
Sevin et al.

(10) Patent No.: US 9,614,883 B2
(45) Date of Patent: Apr. 4, 2017

(54) METHOD AND DEVICE FOR TRANSMITTING UNCOMPRESSED VIDEO STREAMS

(71) Applicant: CANON KABUSHIKI KAISHA, Tokyo (JP)

(72) Inventors: Julien Sevin, St Aubin du Cormier (FR); Pascal Lagrange, La Chapelle des Fougeretz (FR)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 14/030,734

(22) Filed: Sep. 18, 2013

(65) Prior Publication Data
US 2014/0089516 A1 Mar. 27, 2014

(30) Foreign Application Priority Data
Sep. 21, 2012 (GB) .................... 1216888.6

(51) Int. Cl.
*G06F 15/16* (2006.01)
*H04L 29/06* (2006.01)
(Continued)

(52) U.S. Cl.
CPC ............ *H04L 65/60* (2013.01); *H04L 1/0067* (2013.01); *H04L 1/08* (2013.01); *H04L 1/1887* (2013.01)

(58) Field of Classification Search
CPC ......... H04L 65/60; H04L 1/0067; H04L 1/08; H04L 1/1887
(Continued)

(56) References Cited

U.S. PATENT DOCUMENTS

| 6,239,815 B1* | 5/2001 | Frink ..................... H04N 19/00 341/60 |
| 6,320,986 B1* | 11/2001 | Strohacker ............. G06T 9/005 382/239 |

(Continued)

OTHER PUBLICATIONS

Vickers, et al.. (Dec. 2000). Source-adaptive multilayered multicast algorithms for real-time video distribution. IEEE/ACM Transactions on Networking (TON), 8(6), 720-733.*
(Continued)

*Primary Examiner* — Kristie Shingles
*Assistant Examiner* — Timothy Sowa
(74) *Attorney, Agent, or Firm* — Canon USA, Inc. I.P. Division

(57) ABSTRACT

The present invention concerns a method and a device of transmitting uncompressed video streams. In particular, the method concerns the adaptation of a wireless transmission to bandwidth reduction and packet loss.

There is provided a computer implemented method for sending uncompressed video data, wherein the video data comprises binary video components, the method comprising generating a plurality of SB packets from a group of video components, each SB packet being constituted by bits of the video components grouped according to their significance; determining available bandwidth for transmission and sending the most SB packets to fit the available bandwidth, beginning by the most significant ones, meaning containing the most significant bits of the video components. Accordingly, the best possible quality is obtained according to the available bandwidth.

12 Claims, 9 Drawing Sheets

(51) Int. Cl.
*H04L 1/08* (2006.01)
*H04L 1/00* (2006.01)
*H04L 1/18* (2006.01)

(58) Field of Classification Search
USPC .......................................................... 709/231
See application file for complete search history.

(56) References Cited

U.S. PATENT DOCUMENTS

| | | | |
|---|---|---|---|
| 7,979,784 B2* | 7/2011 | Shao et al. ..................... | 714/807 |
| 8,212,828 B2* | 7/2012 | Wells et al. .................... | 345/530 |
| 2007/0189397 A1 | 8/2007 | Ngo et al. | |
| 2007/0230461 A1* | 10/2007 | Singh et al. .................. | 370/389 |
| 2007/0234134 A1 | 10/2007 | Shao et al. | |
| 2007/0240191 A1 | 10/2007 | Singh et al. | |
| 2008/0130741 A1* | 6/2008 | Chiang et al. ........... | 375/240.01 |
| 2008/0192726 A1* | 8/2008 | Mahesh et al. ............... | 370/349 |
| 2008/0253462 A1* | 10/2008 | Singh et al. ............. | 375/240.25 |
| 2009/0109944 A1* | 4/2009 | Kwon et al. ................... | 370/338 |
| 2009/0138774 A1* | 5/2009 | Singh et al. ................... | 714/748 |
| 2009/0187672 A1* | 7/2009 | Wiley et al. ................... | 709/233 |
| 2010/0195646 A1* | 8/2010 | Lee et al. ...................... | 370/389 |
| 2010/0223526 A1* | 9/2010 | Hong et al. ................... | 714/755 |
| 2011/0141968 A1* | 6/2011 | Trainin ......................... | 370/328 |
| 2012/0002103 A1* | 1/2012 | Shao et al. .................. | 348/388.1 |
| 2014/0089516 A1 | 3/2014 | Sevin et al. | |

OTHER PUBLICATIONS

Tan, W. T., et al. (1999). Real-time Internet video using error resilient scalable compression and TCP-friendly transport protocol. IEEE Transactions on Multimedia, 1(2), pp. 172-186. Retrieved from http://ieeexplore.ieee.org/xpls/abs_all.jsp?arnumber=766738.*

GB Examination Report for Application No. GB1216888.6 dated Jun. 24, 2015, pp. 1-2.

* cited by examiner

METHOD AND DEVICE FOR TRANSMITTING UNCOMPRESSED VIDEO STREAMS

REFERENCE TO RELATED APPLICATIONS

This application claims the benefit under 35 U.S.C. §119 (a)-(d) of United Kingdom Patent Application No. 1216888.6, filed on Sep. 21, 2012 and entitled "Method and device for transmitting uncompressed video streams". The above cited patent application is incorporated herein by reference in its entirety.

BACKGROUND OF THE INVENTION

The present invention concerns a method and a device of transmitting uncompressed video streams. In particular, the method concerns the adaptation of a wireless transmission to bandwidth reduction and packet loss.

New recent multimedia applications, such as high-definition audio/video streaming, require wireless transmission of uncompressed video at high data rate of about several Gbps (Gigabits per second), with low latency.

As an example, high definition (HD) video generally refers to a sequence of 60 Hz video frames with 1920 vertical lines and 1080 horizontal lines corresponding to 1920×1080 pixels of 24 bits. A video wireless communication system that supports such HD video, referred to as uncompressed HD 1080p video, requires a channel bandwidth of about 3 Gbps to support video data only. Such rate is not achievable in current 802.11 wireless communication systems using the 2.4 GHz and 5 GHz radio bands. To overcome the limits of these radio bands, higher frequencies, for instance the 57-66 GHz millimeter-wave unlicensed spectrum, referred to as 60 GHz millimeter wave technology, are used.

60 GHz-based communication systems are widely studied (e.g. IEEE 802.11 Task Group; IEEE 802.15.3c standard; Wireless HD; WiGiG; etc.) and the research community proposes several solutions and methods to transport the audio and video applications with a desired quality of service (QoS). In wireless communication systems, before a video stream is transmitted, connection setup and channel bandwidth reservation are typically conducted. Ideally, sufficient channel bandwidth can be allocated and the video stream can be transmitted smoothly after stream set-up control.

However, it may happen that the channel bandwidth is not sufficient. For instance, the video stream may not receive sufficient channel bandwidth due to other concurrent transmissions on the same channel or due to the high sensitivity of the 60 GHz millimeter wave technology to perturbations, such as shadowing or interference, or fading phenomena making the quality of the wireless channel dynamically change over time. For instance, 60 GHz wireless channels with beam-formed transmissions may be affected even by a person moving in the neighbourhood of the emitter or receiver which appears as an unexpected obstacle on a transmission path. In these cases, the degradation of the communication channels requires, for example, changing the channel coding, for instance by increasing the redundancy data, or/and the type of modulation of video data. Some other unexpected perturbations may also happen as synchronization problem or PHY preamble loss. Such problems result in the initial allocated channel bandwidth being no longer sufficient for the transmission. Some packets have to be discarded. But a packet contains a portion of the video and typically video components of adjacent pixels. Consequently, when a packet is discarded, an area of the video is not displayed and provokes a poor video rendering for the users.

In order to cope with these unexpected perturbations, a typical way is to introduce an error-control method at MAC level such as an Automatic Repeat reQuest (ARQ) scheme in order to optimize the reliability of the transmission. In a typical ARQ method some acknowledge messages are exchanged between the receiver and the emitter to enable the retransmission of these erroneous packets. For this purpose, the sender introduces a Cyclic Redundancy Check (CRC) in each sent packet. The receiver uses this CRC to determine whether the packet is erroneous or not and indicate the output in a message referred to as acknowledge message or ack. The acknowledge message is sent from the receiver to the sender. According to the value of the ack, the sender retransmits the erroneous packets. There are several known strategies to manage the error detection, the retransmission (selective repeat, go back n, . . . ) and the acknowledgements (cumulative, selective, . . . ). A main feature often used for the high rate transmission is the block acknowledgement: instead of transmitting an individual acknowledge message for each packet, multiple packets can be acknowledged together using a single acknowledge message. It allows reducing strongly the overhead introduced by the mechanism and to improve the latency.

Typically, an ARQ scheme is able to recover up to a fixed packet error rate, referred to as the capacity of the ARQ scheme, which depends on the available bandwidth dedicated to retransmission in order to preserve the data throughput. Typically, in 802.15.3c or wireless HD, an ARQ scheme is able to recover a Packet Error Rate (PER) between 0 and 2%. The available bandwidth for retransmission data is fixed at the initialization of the system and depends on several configuration parameters such as acknowledge scheme, aggregation scheme and so on.

Unfortunately, when the PER exceeds the capacity of the ARQ scheme, some packets to be retransmitted have to be discarded arbitrary. Consequently, an area of the video is not displayed which provokes a poor video rendering for the users.

SUMMARY OF THE INVENTION

The present invention has been devised to address one or more of the foregoing concerns.

The invention aims at limiting the perceived quality loss in case of transmission channel perturbation reducing the available bandwidth. It concerns an efficient video transmission scheme considering a limited bandwidth budget. It is based, among other things, on giving priority to packets containing higher significant information than other packets even though the higher significant information packet is a retransmission. This has the advantage of optimizing usage of a fixed transmission/retransmission budget for enhancing rendering quality of the video information.

According to a first aspect of the invention there is provided a method for sending uncompressed video data, wherein the video data comprises binary video components, the method comprising generating a plurality of packets from a group of video components, each packet, referred to as SB packet, being constituted by bits of the video components grouped according to their significance and sending generated SB packets, wherein the sending or re-sending of SB packets containing higher significant bits of the video components takes precedence over the sending or re-sending of SB packets containing lower significant bits of the video components.

In an embodiment the method further comprises determining available bandwidth for transmission and sending the most SB packets to fit the available bandwidth, beginning by the most significant ones, meaning containing the most significant bits of the video components. Accordingly, the best possible quality is obtained according to the available bandwidth.

In an embodiment the method further comprises receiving at least an acknowledge message from the receiver indicating for each sent SB packet if it has been received correctly; retransmitting SB packets that have not been received correctly; sorting the remaining SB packets, that have not been sent due to preceding retransmission of most significant packets, according to their significance and sending the most remaining SB packets to fit the available bandwidth, beginning by the most significant ones. Accordingly, the most significant packet lost during the transmission are sent anew before sending less significant packets.

In an embodiment, the transmission being made using frames, constituted by a set of subframes, wherein the method further comprises choosing the size of the group of video components to fit the size in bits of the subframes. Accordingly, the transport format fit the logical structure of data, minimizing the needed transformations for the transmission.

In an embodiment the method further comprises determining a block of video components, constituted by a plurality of said groups of video components, the number of groups being chosen to fit the number of subframes within a frame; considering the SB packets generated as a block of rows and columns of SB packets, each column of SB packets containing the SB packets obtained from a given group of the block of video components; generating frames constituted by subframes, each subframe containing exactly one SB packet from one column of the block of SB packets and sending said frames. Accordingly, the block of video components constitutes a data unit fitting both the logical needs and the physical constraints of the transmission.

In an embodiment, in each column of the block of SB packets, the SB packets are stored in decreasing order of significance. Accordingly, they can be treated in sequence.

In an embodiment frames are generated with subframes containing the most significant SB packet still to be sent for each column of the block of SB packets.

In an embodiment the method further comprises determining a number of frame to be sent according to the available bandwidth; initializing for each column the next SB packet to be sent as the most significant SB packet of the column; and for each frame to be sent: generating the frame to be sent with the next SB packet to be sent for each column; receiving an acknowledge message indicating for each SB packet of the sent frame if it has been correctly received and updating the next SB packet to be sent for each column according to this acknowledge message received as the most significant SB packet that has not been yet correctly received. Accordingly, the generation of the frame is simple from the block of video components.

According to another aspect of the invention there is provided a method for receiving uncompressed video data, wherein the video data comprises binary video components, the method comprising: receiving a plurality of SB packets constituted by the bits of same significance of a the video components of a group of video components and generating the video components from the SB packets received.

In an embodiment the method further comprises concealing the error due to least significant SB packet missing.

In an embodiment the method further comprises generating an acknowledge message to indicate if the SB packets are correctly received and sending back this acknowledge message to the sender.

In an embodiment the transmission being made using frames, constituted by a set of subframes, wherein the size of the group of video components is the size in bits of the subframes, receiving a plurality of SB packets comprises receiving frames containing exactly one SB packet in each subframe.

In an embodiment, a block of video components being constituted by a plurality of said groups of video components, the number of groups being chosen to fit the number of subframes within a frame, the method further comprises: receiving a set of frames and generating a block of rows and columns of SB packets from the received frame, each SB packet in the frame going in the corresponding column in the block, each column of SB packets containing the SB packets corresponding to a given group of the block of video components.

In an embodiment the method further comprises generating a status word for each received frame indicating for each SB packet within the frame if it has been correctly received; and the column of the block are filled in order by the correctly received packet of the frame.

In an embodiment the method further comprises receiving most significant remaining SB packets according and storing them in said block.

According to another aspect of the invention there is provided an emitter for sending uncompressed video data, wherein the video data comprises binary video components, the emitter comprising: a generator for generating a plurality of SB packets from a group of video components, each SB packet being constituted by bits of the video components grouped according to their significance; means for determining available bandwidth for transmission and a sending module for sending the most SB packets to fit the available bandwidth, beginning by the most significant ones, meaning containing the most significant bits of the video components.

In an embodiment the emitter further comprises a receiving module for receiving at least an acknowledge message from the receiver indicating for each sent SB packet if it has been received correctly; an adapted sending module for retransmitting SB packets that have not been received correctly; a sorting module for sorting the remaining SB packets, that have not been sent due to preceding retransmission of most significant packets, according to their significance and an adapted sending module for sending the most remaining SB packets to fit the available bandwidth, beginning by the most significant ones.

In an embodiment, the transmission being made using frames, constituted by a set of subframes, the emitter further comprises a choosing module for choosing the size of the group of video components to fit the size in bits of the subframes.

In an embodiment the emitter further comprises a determining module for determining a block of video components, constituted by a plurality of said groups of video components, the number of groups being chosen to fit the number of subframes within a frame; means for considering the SB packets generated as a block of rows and columns of SB packets, each column of SB packets containing the SB packets obtained from a given group of the block of video components; an adapted generator for generating frames constituted by subframes, each subframe containing exactly one SB packet from one column of the block of SB packets and an adapted sending module for sending said frames.

In an embodiment, in each column of the block of SB packets, the SB packets are stored in decreasing order of significance.

In an embodiment frames are generated with subframes containing the most significant SB packet still to be sent for each column of the block of SB packets.

In an embodiment the emitter further comprises means for determining a number of frame to be sent according to the available bandwidth; means for initializing for each column the next SB packet to be sent as the most significant SB packet of the column; and for each frame to be sent: an adapted generator for generating the frame to be sent with the next SB packet to be sent for each column; an adapted receiving module for receiving an acknowledge message indicating for each SB packet of the sent frame if it has been correctly received and means for updating the next SB packet to be sent for each column according to this acknowledge message received as the most significant SB packet that has not been yet correctly received.

According to another aspect of the invention there is provided a receiver for receiving uncompressed video data, wherein the video data comprises binary video components, the method comprising: a receiving module for receiving a plurality of SB packets constituted by the bits of same significance of a the video components of a group of video components; and a generator for generating the video components from the SB packets received.

In an embodiment the receiver further comprises an adapted generator for concealing the error due to least significant SB packet missing.

In an embodiment the receiver further comprises means for generating an acknowledge message to indicate if the SB packets are correctly received and a sending module for sending back this acknowledge message to the sender.

In an embodiment, a block of video components being constituted by a plurality of said groups of video components, the number of groups being chosen to fit the number of subframes within a frame, the receiver further comprises an adapted receiver for receiving a set of frames and an adapted generator for generating a block of rows and columns of SB packets from the received frame, each SB packet in the frame going in the corresponding column in the block, each column of SB packets containing the SB packets corresponding to a given group of the block of video components.

In an embodiment the receiver further comprises means for generating a status word for each received frame indicating for each SB packet within the frame if it has been correctly received; and means for filling the column of the block in order by the correctly received packet of the frame.

In an embodiment the receiver further comprises an adapted receiver module for receiving most significant remaining SB packets according and storing them in said block.

According to another aspect of the invention there is provided a computer program product for a programmable apparatus, the computer program product comprising a sequence of instructions for implementing a method according to the invention when loaded into and executed by the programmable apparatus.

According to another aspect of the invention there is provided a computer-readable storage medium storing instructions of a computer program for implementing a method, according to the invention.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF THE PREFERRED EMBODIMENT

In one illustrative example of the invention, the wireless communication system is made of a set top box as wireless transmitting station and of a High Definition TV set or projector as wireless receiving station. In this example, the wireless transmitting station sends HD uncompressed video 1080p to the wireless receiving station via a wireless communication medium.

Figure 1:
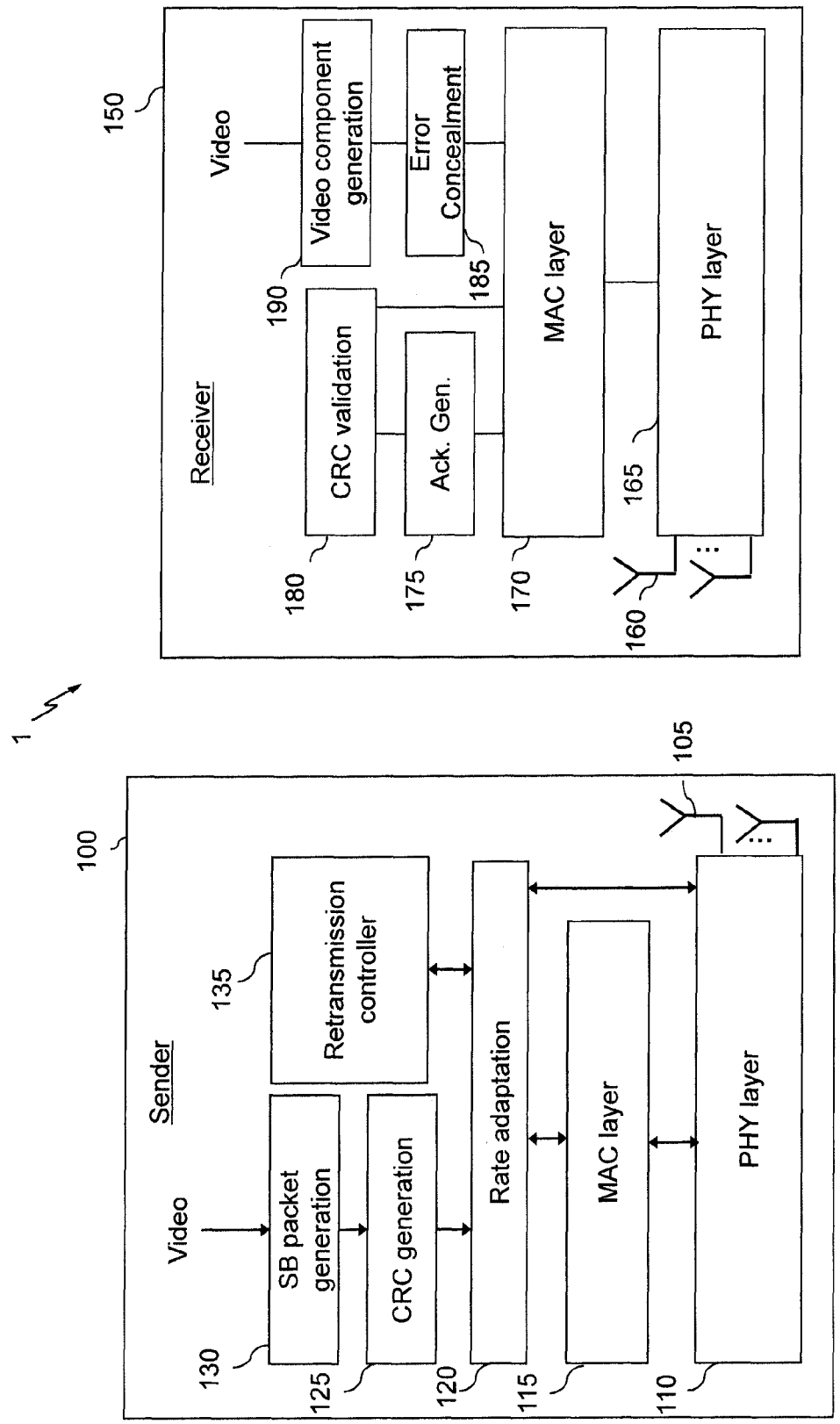
FIG. 1 illustrates the architecture of the transmission system according to an embodiment of the invention.

FIG. 1 illustrates, through functional blocks, such a wireless communication system 1. The system 1 includes a wireless sender 100 and a wireless receiver 150. The sender 100 contains a PHY layer 110, a MAC layer 115, a rate adaptation module 120, a CRC generation module 125, a SB packet generation module 130, and a retransmission controller 135.

The SB packet generation module 130 receives uncompressed high definition video stream from the higher layers. These layers may be, for instance, a video source such as a HD DVD player. A typical HD uncompressed video as 1080p is characterized by video frames of 1920 vertical lines and 1080 horizontal lines, 24 bits per pixel (4:4:4 sampling) and 60 Hz as frame rate. The SB packet generation performs a specific packet generation of the received video and generates packets, referred to as SB packets, according to the present invention. Details of the SB packet generation process according to various embodiments of the invention are provided below with reference FIG. 3. The SB packets generated by 130 are sent to the CRC generation module 125.

For each received packet, CRC generation module 125 generates a Cyclic Redundancy Check (CRC). Next, module 125 sends each SB packet and its corresponding CRC to the rate adaptation module 120. Rate adaptation module 120 determines the available bandwidth and according to it, it may drop some SB packets (and their corresponding CRC) if the available bandwidth is considered not sufficient. The dropping is performed according to the present invention. Details of the available bandwidth determination and dropping processes according to various embodiments of the invention are provided below with reference FIG. 6 and FIG. 7. Rate adaption module 120 is connected to PHY layer 115 in order to know the amount of available bandwidth. Indeed, PHY layer 115 configures its parameters such as its modulation mode (QPSK, 16-QAM, 32-QAM) and channel coding (code rate of 1/3, 2/3) according the condition of the medium in order to optimize the bandwidth in terms of rate and quality. The SB packets and their corresponding CRC not dropped by the rate adaption module 120 are sent to MAC layer 115.

MAC layer 115 places the SB packets and their corresponding CRC in MAC protocol data unit. In one embodiment, MAC layer 115 generates one MAC protocol data unit by SB packet. In a second embodiment, MAC layer 115 is able to aggregate several SB packets in one MAC protocol data unit in order to reduce the overhead. MAC layer 115 transmits the MAC protocol data units to the PHY layer 110. Mac layer 115 also provides addressing and channel access control mechanisms.

Physical (PHY) layer 110 transmits packets over the wireless system to the receiver device 150. In order to transmit data as HD uncompressed video, PHY layer 110 relies upon Millimeter Wave frequency bands, as for instance 60 GHz or even higher and the data are sent over the wireless medium using smart antennas 105.

Receiver 100 contains a PHY layer 165, a MAC layer 170, an acknowledge generation module 175, a CRC validation and error detection module 180, an error concealment module 185 and a video component generation module 190. Receiver 150 receives packets by its smart antennas 160 connected to PHY layer 165. PHY layer 165 carries out the demodulation and channel decoding of the packets up to MAC layer 170. For each MAC protocol data unit packet in MAC layer 170, the receiver 150 uses CRC validation and error detection module 180 in order to validate the CRC value of each SB packets included in the received MAC protocol data unit packet and in this way detect erroneous SB packets.

Moreover, receiver 150 uses acknowledge generation module 175 which generates acknowledge packets in order to indicate to sender 100 which SB packets in the received MAC protocol data unit packet are erroneous. Module 175 is used in conjunction with module 180, the values of the acknowledge packet are the output of module 180, and module 170 for the generation and sending of the acknowledge packet.

Receiver 150 sends each SB packets received by MAC layer 170 to Error Concealment module 185 in order to recover, if necessary, SB packets definitely not received. Next, it sends the corrected SB packets to the video component generation module 190. The video component generation module 190 performs the inverse operation of the module 130. The output uncompressed video pixels are sent to the higher layers.

The aforementioned described architecture may be implemented in many ways, such as program instructions for execution by a processor, as logic circuits, as an application specific integrated circuit. Moreover in wireless sender 100, modules 120,125,130 and 135 are described separate from the MAC layer but in another embodiment they can be implemented in MAC layer 115. Similarly, in wireless receiver 150, modules 175, 180 and 185 can be also implemented in MAC layer 170.

Figure 2:
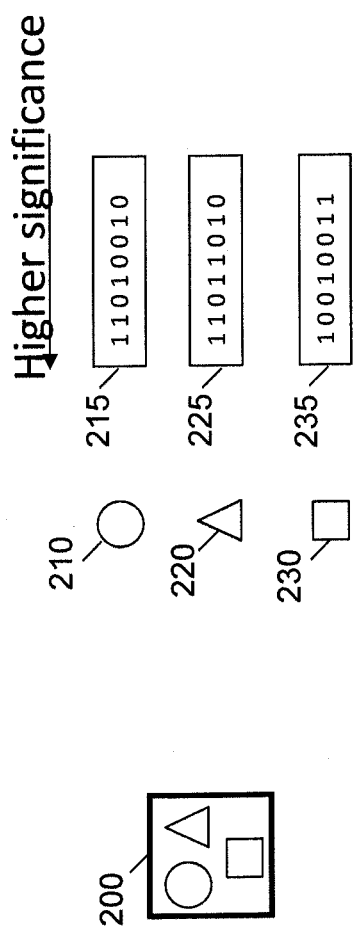
FIG. 2 illustrates the video component bit ordering in an uncompressed video.

FIG. 2 illustrates the video component bit ordering in an uncompressed video. Basically, an uncompressed video image contains 1920 vertical lines and 1080 horizontal lines corresponding to 1920×1080 pixels. Each pixel 200 of an uncompressed video frame is made of 3 video components Y 210, Cb 220 and Cr 230. Y, 210, referred to as luminance, or luma, video component, represents the brightness of the image, i.e. the achromatic or "black & white" portion of the image while Cb, 220, and CR, 230, referred to as chrominance, or chroma, components, represent the colour information, namely the blue information minus the brightness for Cb and the red information minus the brightness for Cr.

Each pixel video component may be displayed with various colour depths, which means that the information related to a pixel video component may be coded with 8 bits, 12 bits, 16 bits or 32 bits, for instance. According to an embodiment of the invention, a pixel video component is coded with 8 bits, 1 byte, and hence it represents a value between 0 and 255. In FIG. 2, the binary value of the luminance Y 210 is displayed by 215 and is equal to 11010010. Its integer value is 210. The binary value of the chrominance Cb 220 is displayed by 225 and is equal to 11011010. Its integer value is 218. The binary value of the chrominance Cr 230 is displayed by 235 and is equal to 10010011. Its integer value is 147.

Among these bits, a bit representing the highest order, a bit at the highest level, is the most significant bit (MSB), and a bit representing the lowest order, a bit at the lowest level, is the least significant bit (LSB). In a more expanded manner, a bit representing the ith highest order is the $i^{th}$ most significant bit and it is referred to as $SB_i$. It is referred to as video component bit ordering.

By definition, if the $SB_i$ is missing in a video component, the next SBs, $SB_{i+1}$, $SB_{i+2}$, and so on, become useless. In this case, the decoder may decide to set a value of 1 for the missing $SB_i$ and replaces the next SBs, $SB_{i+1}$, $SB_{i+2}$, and so on, by the value 0. This operation consists in taking an average value.

Figure 3:
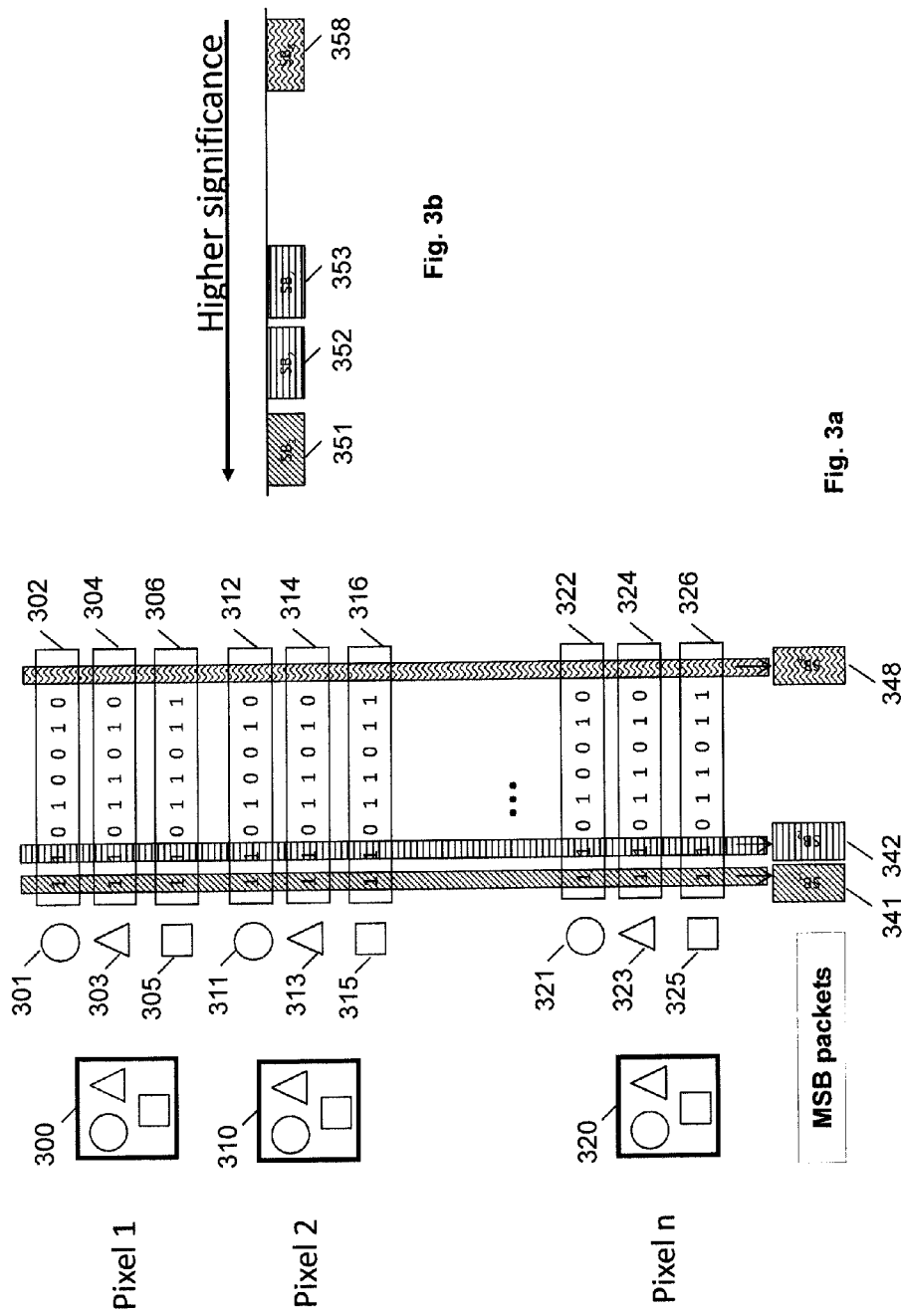
FIGS. 3a and 3b illustrates the video packet ordering in an uncompressed video according to an embodiment of the invention.

FIG. 3 illustrates the video packet ordering in an uncompressed video. The main concept is to transpose the video component bit ordering at packet level.

For this purpose, a set of n pixels is selected represented by 300, 310 and up to 320. Each pixel has 3 video components, one luma Y, one chroma Cb and one chroma Cr. The luma Y of pixel 300, respectively 310 and 320, is represented by component 301, respectively 311 and 321. Its binary coding is represented by 302, respectively 312 and 322. Chroma Cb of pixel 300, respectively 310 and 320 is represented by 303, respectively 313 and 323. Its binary coding is represented by 304, respectively 314 and 324. Chroma Cr of pixel 300, respectively 310 and 320 is represented by 305, respectively 315 and 325. Its binary coding is represented by 306, respectively 316 and 326.

A $SB_i$ packet is created by taking the $SB_i$ of each video component of the n pixels. Its size is 3n bits. Hence the $SB_1$ packet 341, $SB_2$ packet 342 up to $SB_8$ packet 348 are respectively constructed from the $SB_1$, $SB_2$, ..., $SB_8$ of each video component of the n pixels.

Alternatively, in some embodiments, the SB packet may be built with two or more columns. For example, the first SB packet may be built to contain the $SB_1$ and $SB_2$ bits of each video component, the second SB packet may be built to contain the $SB_3$ and $SB_4$ bits of each video component. In any case, the SB packet is built with bits of the video components grouped according to their significance.

This specific packet generation of the video data is referred to as the SB packet generation. It allows to have an equivalent ordering as the video component bit ordering at packet level. This specific ordering is referred to as video packet ordering. It is displayed in FIG. 3b. At the end of the SB packet generation, C SB packets are created, C being the colour depth of the video components. Typically C is equal to 8. Hence, $SB_1$ packet 351, $SB_2$ packet 352, ... $SB_8$ packet 358 are generated and the $SB_1$ packet is the most significant, $SB_2$ packet is the second most significant, ... and $SB_8$ packet is the least significant. Indeed, if the $SB_1$ packet is missing, 3n $SB_1$ of 3n video components are missing when if the $SB_8$ packet is missing, 3n $SB_8$ of 3n video components are missing. In the notation $SB_r$, the identifier r is referred to as the significance identifier.

By definition, equivalently to video component bit ordering, if the $SB_i$ packet is missing, the next SB packets, $SB_{i+1}$, $SB_{i+2}$, and so on, become useless.

Figure 4:
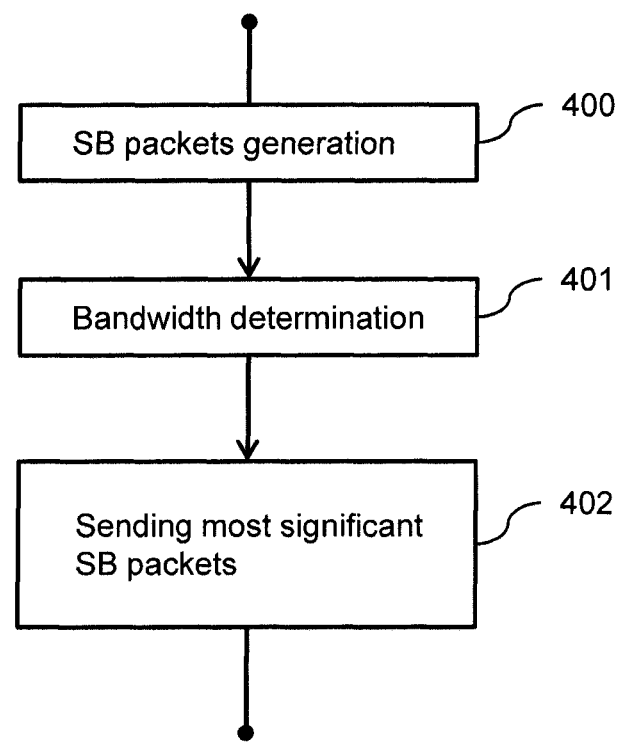
FIG. 4 illustrates the flowchart of the general sending method according to an embodiment of the invention.

FIG. 4 is a flowchart illustrating general steps of the sending method on uncompressed video frame according to an embodiment of the invention. This flowchart is implemented in sender 100 in FIG. 1 and is typically performed by module 130, optionally module 125 in FIG. 1, for step 400, module 120 in FIG. 1 for step 401 and module 125 in FIG. 1 for step 402.

Step 400 generates a plurality of SB packets from a group of video components. The SB packet generation is described with reference to FIG. 3. The video components may be spatially adjacent or not. According to an embodiment, they have been already stocked in a specific memory directly filled by the upper layer. According to another embodiment, they are included in upper layer packets.

Step 401 determines the available bandwidth. It is determined according the parameters of MAC layer regardless the medium condition and PHY layer which depends of the medium condition. In the exemplary embodiment, the transmission is based on Time Division Multiple Access, for example using standard IEEE 802.15.3. Then, the parameters of the MAC layer are for instance the superframe duration, the beacon duration, the frame header, the short interframe space, .... The parameters of the PHY layer are, for example, the modulation mode, the channel coding scheme, the PHY preamble and so on. According to these parameters, it is easy for the person skilled in the art to determine the remaining bandwidth after the first transmission scheme and in this way, the number of SB packets which could be sent in a given transmission period.

In step 402 the most significant SB packets, meaning the SB packets containing the most significant bits of the video components, are sent according to the available bandwidth. If the available bandwidth is sufficient all the packets are sent. In the other case, the SB packets with the higher order, meaning containing the most significant bits are sent. The SB packets with the lowest order, meaning containing the least significant bits are discarded.

Consequently, when the conditions are very bad and there is not enough bandwidth for the transmission, the data which can't be transmitted are the less relevant in terms of video rendering quality, the features of the uncompressed video are fully exploited. In any case, at least the most significant bits of every video component are transmitted, meaning that all pixels could be displayed at least with an approaching value of the actual pixel.

Figure 5:
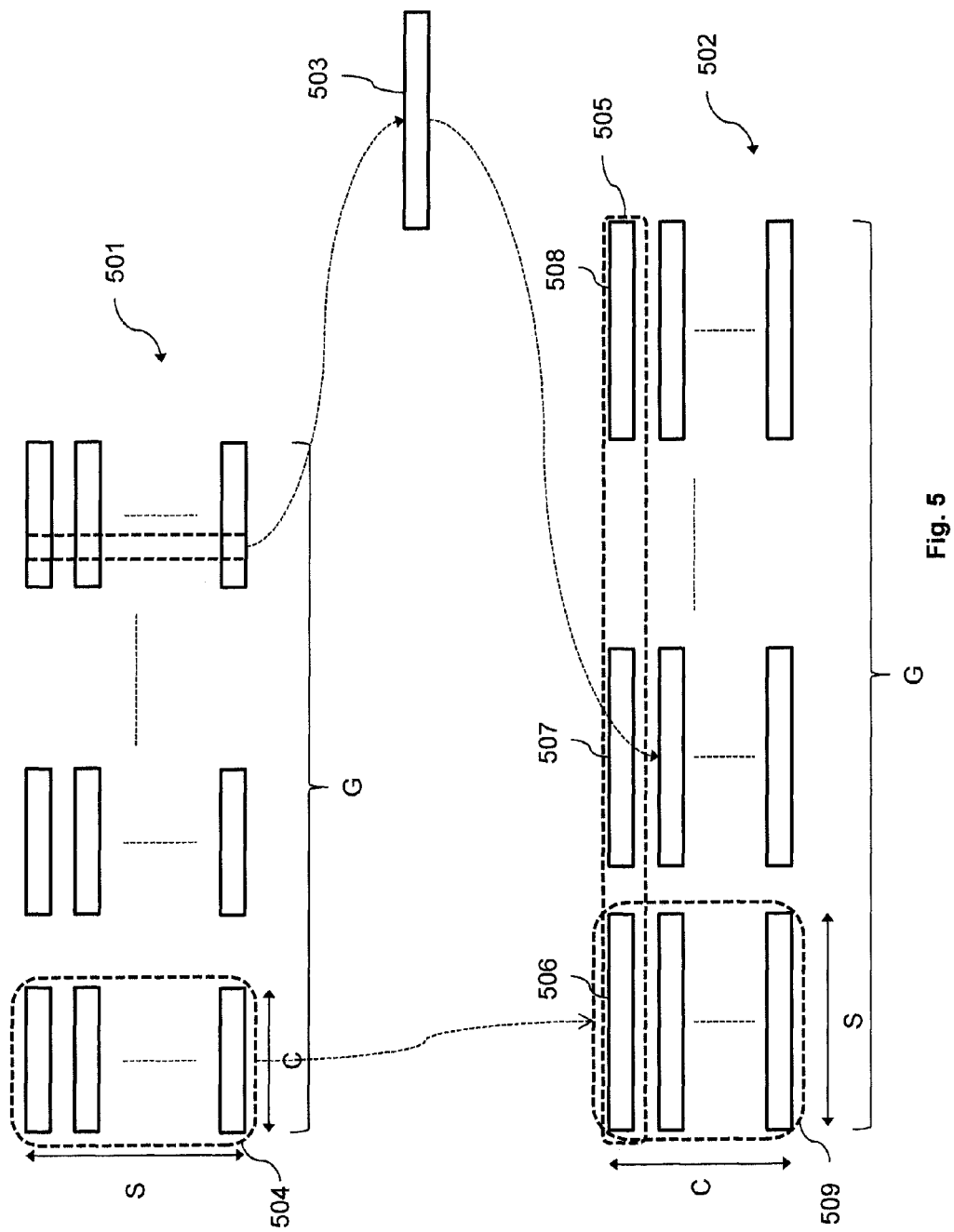
FIG. 5 illustrates the SB packet generation for a block of video components according to an embodiment of the invention.

FIG. 5 illustrates the SB packet generation for a block of video components according to an embodiment of the invention.

According to this embodiment of the invention, the size and structure of the MAC layer packet data unit (PDU) is advantageously taken into account. The sending of data will use a data structure called a frame herein. Such a frame can be seen on FIG. 5 referenced 505. It aggregates a number of subframes 506, 507 and 508. A checksum is computed and integrated to each subframe. Accordingly the frame is sent at once by the sender to the receiver. The latter when receiving the frame validates each subframe by checking the associated checksum and send back to the sender a status word indicating for each subframe if it has been received correctly.

The video components to be sent will be advantageously treated to fit this frame structure. Said video components having a colour depth C are gathered into groups 504 containing S video components. The size of the group S is chosen to fit the size of the subframes constituting the frames. Then we consider a block of video components 501 constituted by a number G of such groups. The number G of groups constituting the block is chosen to fit the number of subframes into the frame structure. The block is therefore constituted by a number G*S video components having a size in bit of G*S*C.

An SB packet generation operation is then carried out to generate some SB packets 503. The size in bit of the generated SB packet is therefore corresponding to the number of rows in the block of video components 501, namely S. This generation is done according to the method for generating SB packet described in the foregoing paragraphs relatively to FIGS. 3a and 3b.

The generated SB packets are considered as a block of SB packet 502 where the SB packets obtained from a given group of video components are stored in one given column of the block. Namely, the first group 504 of the block of video component 501 is stored in the first column 509 of the block of SB packets 502. The SB packets are stored advantageously in decreasing order of significance. Meaning the SB packet of higher order is stored in the first row of the column. The SB packet of second higher order is stored in the second row of the column and so on.

Doing so, each row of the SB packet block is constituted by SB packet of the same order. The first row is constituted by SB packets of the higher order, namely 8 in the example where C is 8. The second row is constituted by SB packets of the second higher order, namely 7 in the example. The last row is constituted by SB packets of the lower order, namely 1. The SB packets block is therefore constituted of C rows of G SB packets of size S in bit. The row index of the SB packet in the block gives its significance order. It is to be noted that each row fits the structure of a frame, with a SB packet for each subframe and having the same size.

Figure 6:
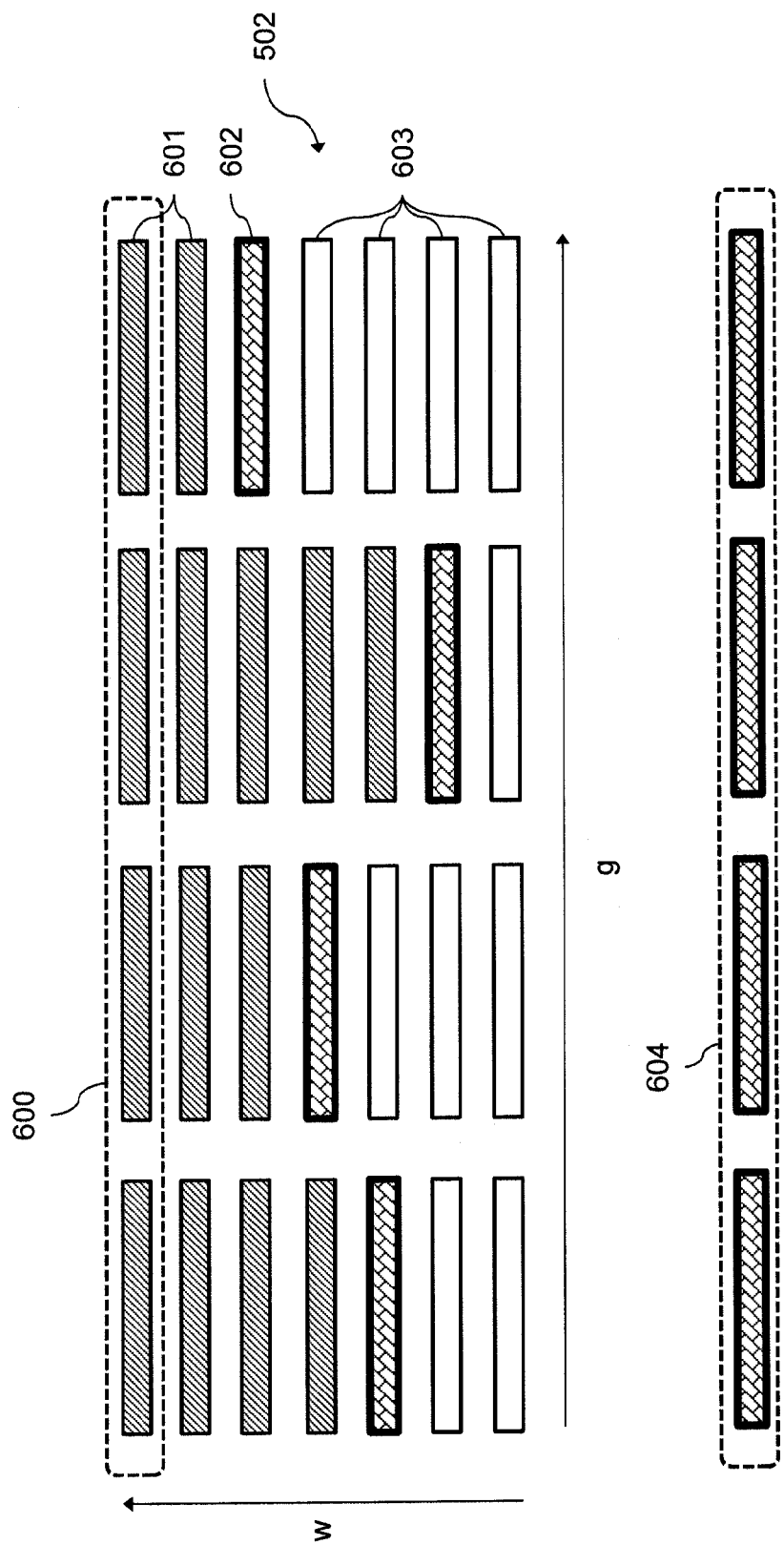
FIG. 6 illustrates the sending method of a block of SB packet according to an embodiment of the invention.

FIG. 6 illustrates the sending method of a block of SB packet according to an embodiment of the invention. The flow chart of the method being illustrated by FIG. 7, both figures will be described together.

In a first step 700, a block of video components is determined advantageously according to the structure of the frame, number of subframe and size. Then the block of SB packets is generated in the step 701 as described relatively to FIG. 5.

According to the method described relatively to FIG. 4, the block of SB packet may be truncated to fit the available bandwidth. It is to be noted that this block realises a sort of the SB packet to be sent according to their significance order or weight. It may therefore be possible to determine that SB packets from the last row or rows will be discarded. This way the sending of the most relevant SB packets is realized.

For the sake of clarity, we will now concentrate on the case where the complete block is to be sent. But the method described may be adapted straightforward for an incomplete block that has been punctured to fit available bandwidth.

According to the exemplary embodiment, when having to send a complete block, the sender begins by generating in a step 702 a first frame 600 containing the first row of SB packets, meaning the row of SB packets having the higher significance order or weight. For this purpose, for example, an index of the next SB packet of higher significance to be sent for each column of the SB packets block is managed. This index is initialized to reference the first row for each column at the beginning of the process, meaning the row 600.

This frame is then sent to the receiver in a step 703. As already explained, the receiver validates the received frame at the subframe level, meaning at the SB packet level considering that each subframe contains exactly one SB packet in the example. The receiver then generates an acknowledge message containing a status word indicating for each SB packet whether it has been received correctly. The receiver sends back this acknowledge message to the sender.

In a step 704, the sender receives the acknowledge message and updates accordingly the index of the next SB packet of higher significance to be sent for each column of the SB packets block. The index of the next packet to be sent is updated to indicate the next SB packet of the same row, meaning the next higher significant SB packet to be sent in the column.

In the step 705, it is tested if all frames have been sent. Namely, when a complete block of SB packets have to be sent, a frame is generated and sent for each row of the block. It means that C frames have to be generated and sent. As will be details below, it may happen specifically in the case of bad transmission conditions, which the SB packets of the last rows, due to errors in preceding packets are never sent. The number of frame sent is the predetermined number needed to send all the packets to be sent once. This number may be less than C when the available bandwidth is not sufficient for the whole block transmission.

In the case of there are still frames to send, the methods comes back to step 702 for the generation of the next frame. It is to be understood here that the frame is not necessarily constituted by a complete row of SB packets having the same significance order. The general case that occurs at step 702 when generating the frame is illustrated on FIG. 6. For each column, a number of SB packets have been successfully sent. These packets are stripped on the figure like packets 601 of the last column. For each column, these packets are necessarily the SB packets of higher significance in that column. The other packets are still to be sent, like the tiled packet 602 and the white packets 603. Accordingly, the index of the next packet to be sent is referencing for each column the packet with the thick border and a tiled filling like the packet 602 of the last column. This is to respect the principle that the sending of a SB packet of lower significance does not make sense if the SB packet of higher significance in the same column, meaning corresponding to the same video components, has not been successfully transmitted. It is to be noted that the SB packets that have not been received correctly are therefore sent again before attempting to send the next SB packet in significance order.

Due to the retransmission of erroneous packets integrated in the first sending stage, at the end of this sending stage it may happen that SB packets remain to be sent. Therefore, at the end of the first sending stage constituted by steps 702 to 705, a second sending stage constituted by steps 706 and 707 is performed. The remaining SB packets, if any, are sorted according to their significance order in a step 706. Then the available bandwidth is determined similarly to the step 401 in FIG. 4. According to this available bandwidth the number of SB packets that could be sent using this bandwidth is determined. If this number exceeds the number of remaining packets, they are all sent again to the receiver. If this number is lower than the number of remaining packets, only the most significant SB packets among the remaining packets are sent. Therefore the principle of always sending in priority the most significant SB packet is still applied also for the retransmission of the lost packets. This is done in step 707.

According to this method, for each group, the most significant SB packets are always transmitted and if some packets are missing these missing SB packets are always the least significant one within the group.

Figure 8:
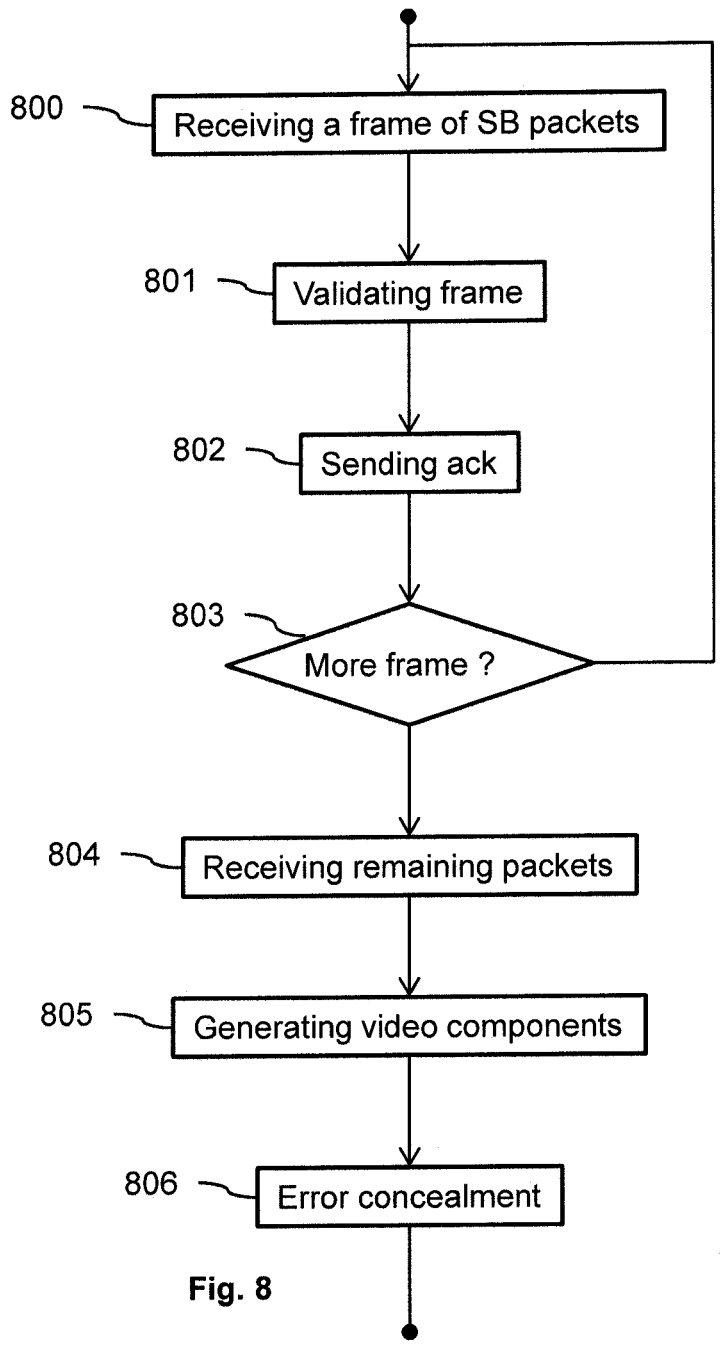
FIG. 8 illustrates the flowchart of a detailed receiving method according to an embodiment of the invention.

FIG. 8 illustrates the flowchart of a corresponding detailed receiving method according to an embodiment of the invention.

Figure 7:
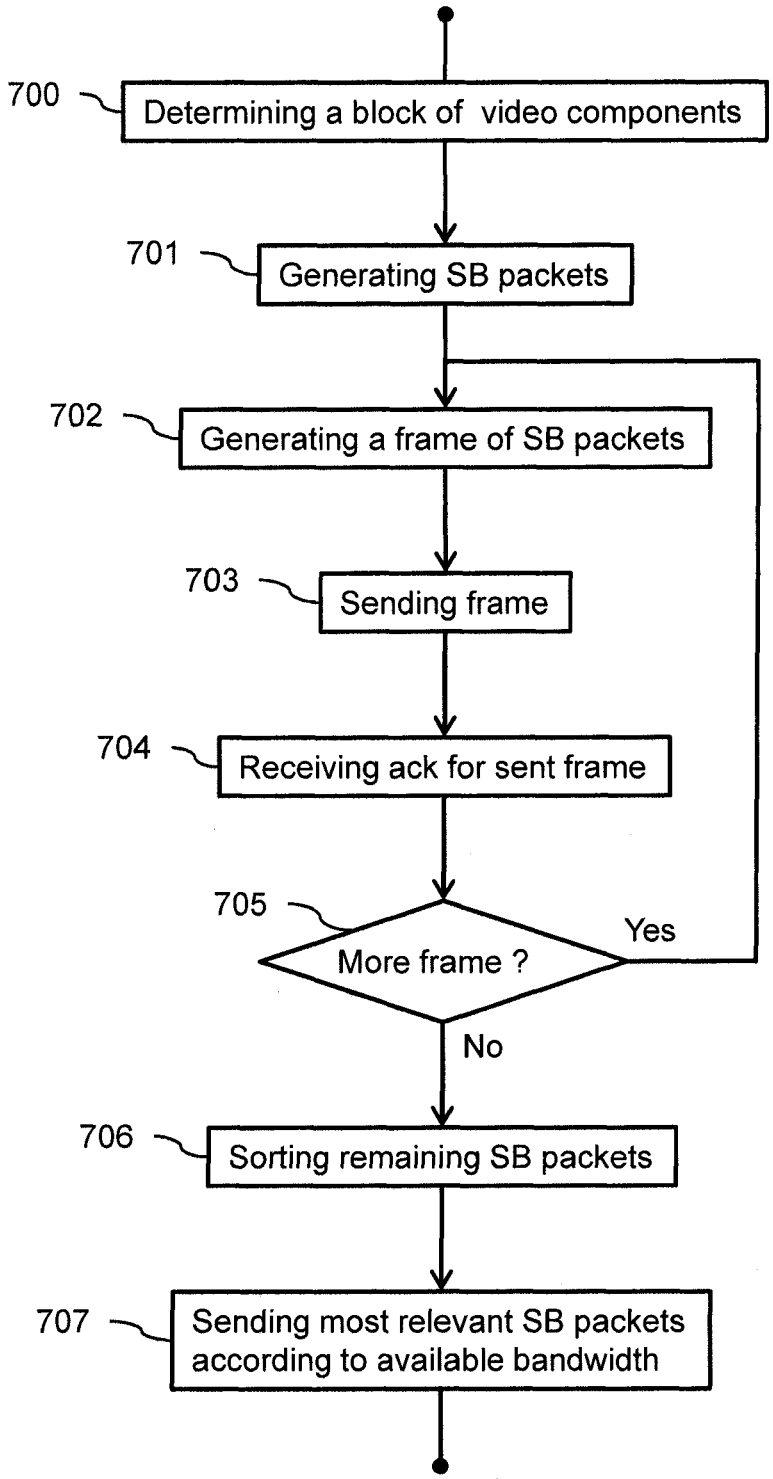
FIG. 7 illustrates the flowchart of a detailed sending method according to an embodiment of the invention.

In a step 800, a frame built according to the method described relatively to FIG. 7 is received from the sender by the receiver. The receiver then validates all the SB packets received within the frame by checking the checksum in a step 801. According to this validation, a status word indicating for each SB packet whether it has been received correctly is built by the receiver. This status word is then sent back to the sender as an acknowledge message in step 802. In step 803, the receiver checks if the last frame of the block has been received. It may, for example, indicated by a flag in the header of the received frame according to a usual mechanism.

If the last frame has not been received, then the receiver steps back to 800 waiting for the next frame. If, the last frame has been received, the receiver waits for the receiving of frames containing remaining packets, meaning the retransmission of the lost packets in step 804. When all frames have been received, the receiver is able to build a block of SB packets similar to the one, 502 on FIGS. 5 and 6, with these received SB packets. The columns of the block are filled in order by the correctly received packet of the frames, frame by frame. Some packets may be missing due to insufficient available bandwidth. Thanks to the invention, these packets will always be the least significant SB packets in each column of the block.

Once the block has been restored, a process of transposition, inverse of the one described relatively to FIGS. 3 and 5 are conducted to generate the video component. This process is performed column by column, each column allowing generating a group of video components. This is done in a step 805 to get back a block of video components similar to the one illustrated by reference 501 in FIG. 5. Due to SB packets missing, some group of video components may have missing least significant bits. A step 806 of error concealment is then performed to deal with these missing data. A possible way to face these missing bits may be to set the most significant missing bit to 1 and the other to 0. This realizes an average on the missing data. Another way may consist in allocating random value to these missing bits which may be better for natural texture.

According to this method, when sending generated SB packets, the sending or re-sending of SB packets containing higher significant bits of the video components takes precedence over the sending or re-sending of SB packets containing lower significant bits of the video components.

Figure 9:
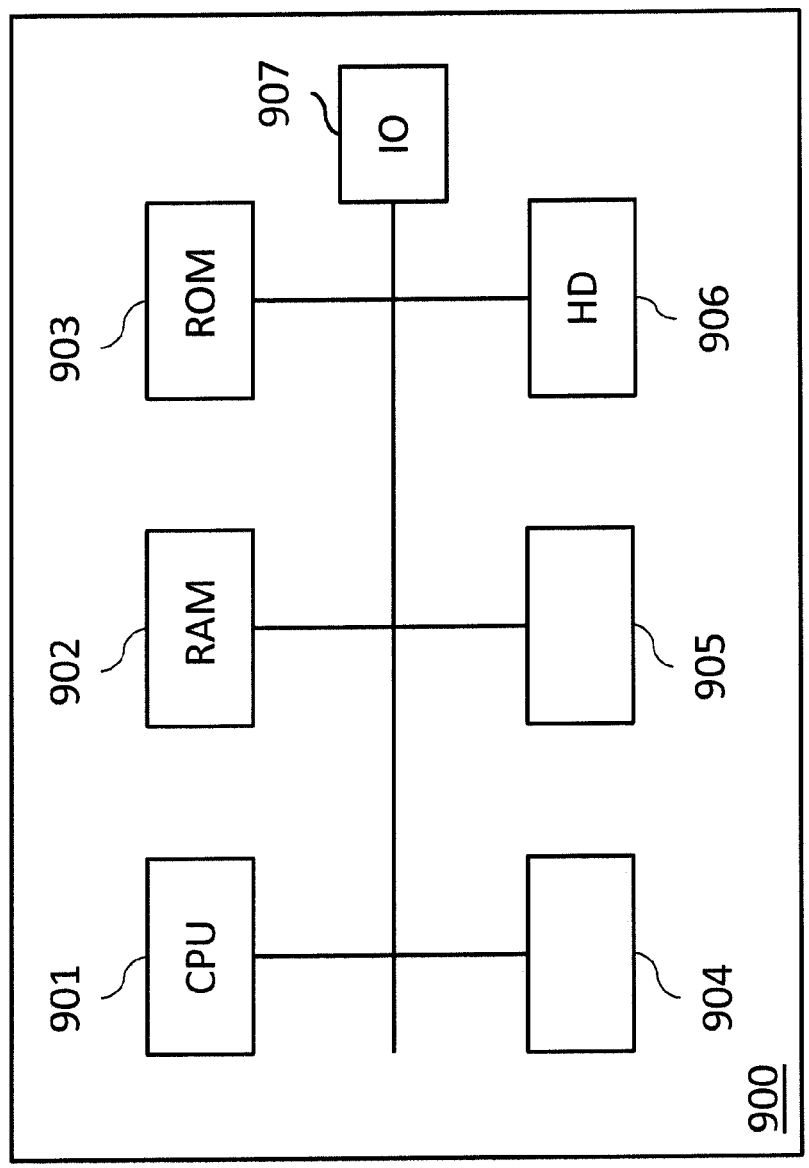
FIG. 9 is a schematic block diagram of a computing device for implementation of one or more embodiments of the invention.

FIG. 9 is a schematic block diagram of a computing device 900 for implementation of one or more embodiments of the invention. The computing device 900 may be a device such as a micro-computer, a workstation or a light portable device. The computing device 900 comprises a communication bus connected to:

- a central processing unit 901, such as a microprocessor, denoted CPU;
- a random access memory 902, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;
- a read only memory 903, denoted ROM, for storing computer programs for implementing embodiments of the invention;
- a network interface 904 is typically connected to a communication network over which digital data to be processed are transmitted or received. The network interface 904 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 901;
- a user interface 905 for receiving inputs from a user or to display information to a user;
- a hard disk 906 denoted HD
- an I/O module 907 for receiving/sending data from/to external devices such as a video source or display The executable code may be stored either in read only memory 903, on the hard disk 906 or on a removable digital medium such as for example a disk. According to a variant, the executable code of the programs can be received by means of a communication network, via the network interface 904, in order to be stored in one of the storage means of the communication device 900, such as the hard disk 906, before being executed.

The central processing unit 901 is adapted to control and direct the execution of the instructions or portions of software code of the program or programs according to embodiments of the invention, which instructions are stored in one of the aforementioned storage means. After powering on, the CPU 901 is capable of executing instructions from main RAM memory 902 relating to a software application after those instructions have been loaded from the program ROM 903 or the hard-disc (HD) 906 for example. Such a software application, when executed by the CPU 201, causes the steps of the flowcharts shown in FIGS. 1 to 4 to be performed.

Any step of the algorithm shown in FIG. 4, 7 or 8 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for sending uncompressed video data, wherein the video data represent at least one image comprising a plurality of pixels, the method comprising:
    ordering, for a video component of a pixel, bits encoding said video component, according to their significance in the video component, wherein a bit being at the $i^{th}$ position after ordering is the $i^{th}$ most significant bit of the bits encoding said video component;
    generating a plurality of packets from a group comprising a plurality of video components, each packet comprising a plurality of bits having the same position in all the video components of the group after ordering; and
    sending generated packets, wherein the sending of packets containing higher significant bits of the video components takes precedence over the sending of packets containing lower significant bits of the video components;
    re-sending at least some of the packets that have not been successfully transmitted; and
    wherein the sending of a packet of lower significance is never made if the packets of higher significance corresponding to the same video components have not been successfully transmitted,
    the transmission being made using frames, constituted by a set of subframes, wherein the method further comprises choosing the size of the group of video components to fit the size in bits of the subframes,
    determining a block of video components, constituted by a plurality of said groups of video components, the number of groups being chosen to fit the number of subframes within a frame;

considering the packets generated as a block of rows and columns of packets, each column of packets containing the packets obtained from a given group of the block of video components;

generating frames constituted by subframes, each subframe containing exactly one packet from one column of the block of packets; and sending said frames.

2. The method according to claim 1, further comprising:
determining available bandwidth for transmission; and where sending generated packets comprises:
sending the most packets to fit the available bandwidth, beginning by the most significant ones, meaning containing the most significant bits of the video components.

3. The method according to claim 2, further comprising:
receiving at least an acknowledge message from the receiver indicating for each sent packet if it has been received correctly;

retransmitting packets that have not been received correctly;

sorting the remaining packets, that have not been sent due to preceding retransmission of most significant packets, according to their significance; and sending the most significant remaining packets to fit the available bandwidth, beginning by the most significant ones.

4. The method according to claim 1, wherein in each column of the block of packets, the packets are stored in decreasing order of significance.

5. The method according to claim 4, wherein frames are generated with subframes containing the most significant packet still to be sent for each column of the block of packets.

6. The method according to claim 4, further comprising:
determining a number of frames to be sent according to the available bandwidth;
initializing for each column the next packet to be sent as the most significant packet of the column; and for each frame to be sent:
generating the frame to be sent with the next packet to be sent for each column;
receiving an acknowledge message indicating for each packet of the sent frame if it has been correctly received; and
updating the next packet to be sent for each column according to this acknowledge message received as the most significant packet that has not been yet correctly received.

7. A non-transitory computer-readable storage medium on which is stored codes of an executable program causing a computer to execute each of the steps of the method according to claim 1.

8. An emitter for sending uncompressed video data, wherein the video data represent at least one image comprising a plurality of pixels, the emitter comprising:
a memory;
a processor coupled to the memory which executes the following:
ordering, for a video component of a pixel, bits encoding said video component, according to their significance in the video component, wherein a bit being at the $i^{th}$ position after ordering is the $i^{th}$ most significant bit of the bits encoding said video component;
generating a plurality of packets from a group comprising a plurality of video components, each packet comprising a plurality of bits having the same position in all the video components of the group after ordering;
determining available bandwidth for transmission; and
sending the most packets to fit the available bandwidth, beginning by the most significant ones, meaning containing the most significant bits of the video components;
re-sending at least some of the packets that have not been successfully transmitted; and
never sending of a packet of lower significance if the packets of higher significance corresponding to the same video components have not been successfully transmitted,
the transmission being made using frames, constituted by a set of subframes, wherein the emitter further comprises choosing the size of the group of video components to fit the size in bits of the subframes,
determining a block of video components, constituted by a plurality of said groups of video components, the number of groups being chosen to fit the number of subframes within a frame;
considering the packets generated as a block of rows and columns of packets, each column of packets containing the packets obtained from a given group of the block of video components;
generating frames constituted by subframes, each subframe containing exactly one packet from one column of the block of packets; and
sending module for sending said frames.

9. The emitter according to claim 8, further comprising:
receiving at least an acknowledge message from a receiver indicating for each sent packet if it has been received correctly;
retransmitting packets that have not been received correctly;
sorting the remaining packets, that have not been sent due to preceding retransmission of most significant packets, according to their significance; and
sending the most significant remaining packets to fit the available bandwidth, beginning by the most significant ones.

10. The emitter according to claim 8, wherein in each column of the block of packets, the packets are stored in decreasing order of significance.

11. The emitter according to claim 10, wherein frames are generated with subframes containing the most significant packet still to be sent for each column of the block of packets.

12. The emitter according to claim 10, further comprising:
determining a number of frames to be sent according to the available bandwidth;
initializing for each column the next packet to be sent as the most significant packet of the column; and for each frame to be sent:
generating the frame to be sent with the next packet to be sent for each column;
receiving an acknowledge message indicating for each packet of the sent frame if it has been correctly received; and
updating the next packet to be sent for each column according to this acknowledge message received as the most significant packet that has not been yet correctly received.

* * * * *